United States Patent [19]

McDowell et al.

[11] Patent Number: 4,463,605

[45] Date of Patent: Aug. 7, 1984

[54] SIMULATOR CIRCUIT FOR ELECTROHYDRAULICALLY CONTROLLED AIRCRAFT SURFACES

[75] Inventors: Leon H. McDowell, Lynnwood; Roger E. Weber, Auburn; Daniel J. Schmieder, Renton, all of Wash.

[73] Assignee: The Boeing Company, Seattle, Wash.

[21] Appl. No.: 379,468

[22] Filed: May 18, 1982

[51] Int. Cl.³ ............................................. G01N 33/00
[52] U.S. Cl. .................................. 73/432 SD; 434/31
[58] Field of Search ............... 73/432 SD; 434/31, 49; 364/578

[56] References Cited

U.S. PATENT DOCUMENTS

| | | |
|---|---|---|
| 2,704,644 | 3/1955 | Good et al. . |
| 3,064,471 | 11/1962 | Pierce . |
| 3,301,510 | 1/1967 | Cook . |
| 3,451,144 | 6/1969 | Chao et al. . |
| 3,555,252 | 1/1971 | Garden . |
| 3,679,880 | 7/1972 | Carver . |
| 3,883,961 | 5/1975 | Limouze . |
| 3,935,440 | 1/1976 | Mood et al. . |
| 4,080,654 | 3/1978 | Walley, Jr. . |
| 4,134,217 | 1/1979 | Neilson . |
| 4,167,821 | 9/1979 | Gibson, Jr. et al. . |

FOREIGN PATENT DOCUMENTS 932684 7/1963 United Kingdom ................... 434/31
424184 2/1972 U.S.S.R. .

OTHER PUBLICATIONS

Kandelman, A. et al., "Simplified Model Eases Hydraulic System Simulation", pp. 65, 66, Apr. 1978.

Primary Examiner—Gerald Goldberg
Assistant Examiner—Joseph W. Roskos
Attorney, Agent, or Firm—Christensen, O'Connor, Johnson & Kindness

[57] ABSTRACT

To simulate, for testing purposes, the subsystems of an aircraft that electrohydraulically position the movable control surfaces of an aircraft, circuitry is provided for receiving input control signals, generated, for example, by an autopilot, and for transforming such signals into electrical output signals that are the analogs of signals produced by linear variable differential transformers (LVDT) feedback devices that track the actual movements and positions of the aircraft control surfaces. The relatively slow acting hydraulic components of the aircraft control subsystems are simulated by integrating circuitry and the resulting integrated signals are used to modulate an AC reference signal, which is then applied to the primaries of isolation transformers, the secondaries of which produce the simulated, analog LVDT feedback signals and also present a load impedance to the autopilot that closely matches the output windings of the simulated LVTDs.

17 Claims, 9 Drawing Figures

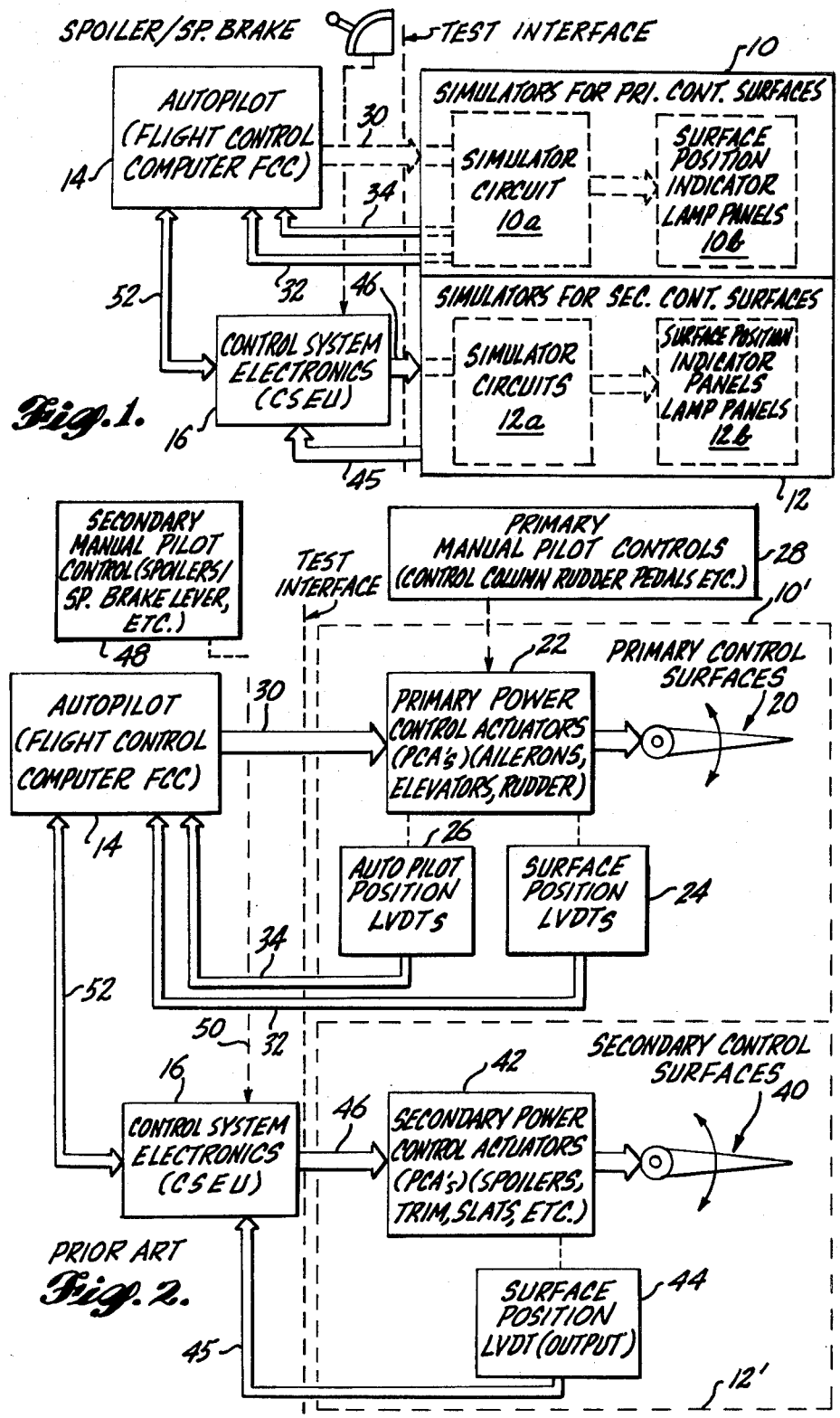

Fig. 3.

SIMULATOR CIRCUIT FOR ELECTROHYDRAULICALLY CONTROLLED AIRCRAFT SURFACES

BACKGROUND

The invention pertains to avionics test equipment, and more particularly to test circuitry for simulating the feedback functions of electrohydraulic control subsystems that move the controllable airfoils, such as ailerons, elevators, spoilers, et cetera, in response to automatic piloting signals.

In airfoil control subsystems of the type pertinent to the present invention, control surfaces are moved by hydraulic actuators that are in turn responsive to electrical control signals such as those generated by an autopilot. The actuator module is sometimes called a power control actuator (PCA) and this actuator may in turn encompass one or more smaller, piloting valves (sometimes called a T-valve as an abbreviation for "transfer" valve) that respond to electrical control signals and pilot a larger actuator valve that performs the work of moving the airplane surface. To drive power control actuators to desired command positions, feedback signals are produced by transducers responsive to the physical movement of the aircraft control surfaces and fed back to the source of the command signals, usually an autopilot. The feedback-generating transducer that performs this function is, in many cases, packaged with the PCA and physically coupled to the mechanical output of the actuator, in this way moving with the actuator output and, hence, in concert with the movement of the control surface. One common type of position transducer is a device called a linear variable differential transformer (LVDT), which comprises a transformer in which the primary and secondary windings are variably coupled by a movable ferromagnetic slug that is mechanically linked to the output of the PCA. An AC reference signal of known amplitude and phase is applied to the primary winding of the LVDT and the output AC signal produced at the LVDT secondary winding varies in amplitude and phase according to the physical movement of the PCA and the associated aircraft control surface.

The electrical command signals that are applied to the PCA are generated by electronic subsystems that govern the flight or assist the pilot in manual flight, and these electronic subsystems may be collectively referred to as automatic pilot controls or autopilots. To test these automatic pilot controls, two alternative techniques have previously been used. First, the automatic pilot controls may be checked out by assembling the entire aircraft system including the PCAs and associated LVDTs and then operating the assembled system while observing movement of the control surfaces and simultaneously taking measurements of the command and feedback signals associated with the PCAs. Another test procedure involves taking measurements of the command signals produced by the automatic pilot control, and then manually adjusting the physical states of dummy LVDTs to produce representative AC feedback signals for application to the automatic pilot control to close the feedback loop.

It will be apparent that both of these testing schemes have severe disadvantages. The first scheme which requires the assembly and connection of all of the aircraft components, including the PCAs and control surfaces, is undesirable for production testing of the automatic pilot controls which need to be checked out before they are installed in the completed aircraft system and, if at all possible, the check-out should be done under laboratory conditions. Additionally, there are certain testing circumstances in which the PCAs and the associated control surfaces are available for complete system testing, but visual verification of the movement of the control surfaces is difficult or impossible, making this first testing procedure inappropriate. The second of the above test procedures is time-consuming, unreliable, and fails to subject the automatic pilot to dynamic loop responses representative of actual feedback control conditions. The tedious process of manually generating feedback signals for the automatic pilot greatly reduces the productivity and accuracy of the testing process.

One previous and unsuccessful effort to overcome such disadvantages was to employ a set of dummy LVDTs, in which the position-sensing ferromagnetic slugs in the LVDTs were controllably moved by drive motors, which in turn were responsive to electrical command signals. However, this attempted simulation failed to operate satisfactorily because of mechanical malfunctions, and alignment problems.

SUMMARY OF THE INVENTION

With this background, it is one aspect of the invention to provide a simulator circuit for simulating an electrohydraulic actuator and the actuator-positioned control surface of the aircraft in order to test and troubleshoot, under closed-loop conditions, those subsystems of the aircraft electronic controls such as the autopilot. For example, the autopilot may generate command signals for causing the actuator to move the aircraft control surfaces to a desired airfoil position. A feedback loop is associated with this operation in which the autopilot receives feedback position signals from the actuator, wherein such position feedback signals are generated by a position-sensing transducer of the linear variable differential transformer (LVDT) type. The simulator circuit of the invention is substituted for the electrohydraulic actuator, the actuator-positioned control surface and the position-sensing LVDT transducer, for closed-loop testing of the autopilot or similar subsystem of the aircraft controls. The simulator circuit comprises an input amplifier for receiving the surface-positioning command signals; an integrator for integrating such command signals to simulate the delayed response of a hydraulic actuator; a modulator circuit; a reference signal source producing an alternating current reference signal; and first and second matched output transformers, each having primary and secondary windings, in which the primary windings are connected to receive the alternating current reference signal via the modulating circuit, which in turn is responsive to the output of the signal integrator. The modulating circuit modulates the reference alternating current in a manner that causes the primary windings of the matched transformers to be driven differentially in response to the output of the signal integrator in which the difference in which these primary windings are driven is in proportion to the magnitude of the integrated command signal. The secondary windings of the matched output transformers are serially connected in phase opposition such that the output across the serially connected secondary windings simulates the output of an LVDT transducer in which the net alternating current output from the serially connected secondary windings is zero when there is no difference in the reference alternating current signals applied to the primary windings (representing a zero output voltage from the integrator) and having a net alternating current voltage output of increasing amplitude and of a phase that is responsive to the magnitude and phase of the difference in alternating current drive signals applied to the primary windings by the modulating circuit acting in response to the output of the signal integrator. Thus, in a closed-loop test of an autopilot, a command signal generated by the autopilot for raising an aileron, will be applied to the simulator circuit for causing the appropriate amplitude and phase response of the alternating current output voltage at the secondary windings of the output transformer to simulate the moved position of the LVDT transducer.

In another aspect of the invention, the simulator circuit includes dual output channels, a first of which incorporates a matched pair of output transformers connected and operating as described above to simulate the position-sensing LVDT transducer which moves with the control surface, and wherein the second output channel is provided by an additional matched pair of output transformers for simulating another LVDT transducer that simulates an intervening autopilot actuator piston that is electrohydraulically controlled in response to an electrical autopilot command signal. The additional matched pair of output transformers operates in a manner similar to the above-described output transformers for simulating a position of the autopilot actuator piston during a manual piloting mode in which such piston is disengaged (floating) relative to the surface control actuator; a transition mode in which the autopilot piston actuator is moved to a position that corresponds to the existing control surface position as represented by the output of the first-mentioned simulated channel; and an autopilot engage mode in which the autopilot actuator piston is locked in as a mechanical input to the control surface actuator for henceforth governing the actuator and the control surface position in response to the electrical autopilot command signal.

In still another aspect of the invention, an array of surface position simulation lamps and associated comparator and switching circuitry is coupled to the output of the above-mentioned signal integrator for responding to the magnitude and sense (polarity) of the integrated command signal. As the integrated command changes to simulate movement of the hydraulically driven control surface, the array of simulation lamps is selectively energized to display by increments the various possible positions of the control surface, such as fly up, fly down, fly left, fly right, et cetera. Thus, by connecting the simulator circuit as described above, the array of lamps can be visually monitored as the autopilot generates various command signals, and the simulator circuit responds to such command signals and generates the appropriate feedback signals via the output transformer channels that simulate the LVDT transducers. The simulator circuit allows for in-laboratory testing and troubleshooting of the aircraft subsystem controls that generate the command signals, such as an autopilot, while closely approximating the actual, dynamic response of the aircraft's electrohydraulic actuator and associated LVDT position-sensing transducers. Furthermore, the secondary windings of the output transformers are chosen to match the resistive, capacitive and inductive impedance characteristics of an LVDT transducer.

To provide a complete disclosure of the invention, reference is made to the appended drawings and following description of one particular and preferred embodiment.

BRIEF DESCRIPTION OF THE DRAWINGS

FIG. 1 is a generalized block diagram showing the arrangement of the simulator circuits, for electrohydraulically controlled aircraft surfaces, with the flight control electronics including an autopilot and control system electronics;

FIG. 2 is a block diagram of the existing (prior art) aircraft system in which the right-hand side of the diagram shows the power control actuators, control surfaces of the aircraft and associated position-sensing LVDT transducers which are replaced, for test purposes, by the simulator circuits shown in FIG. 1;

FIG. 3 is a detailed block diagram of a dual output channel simulator circuit for one of the primary control surfaces of an aircraft, such as the ailerons;

DETAILED DESCRIPTION OF THE PREFERRED EMBODIMENT

Figure 4:
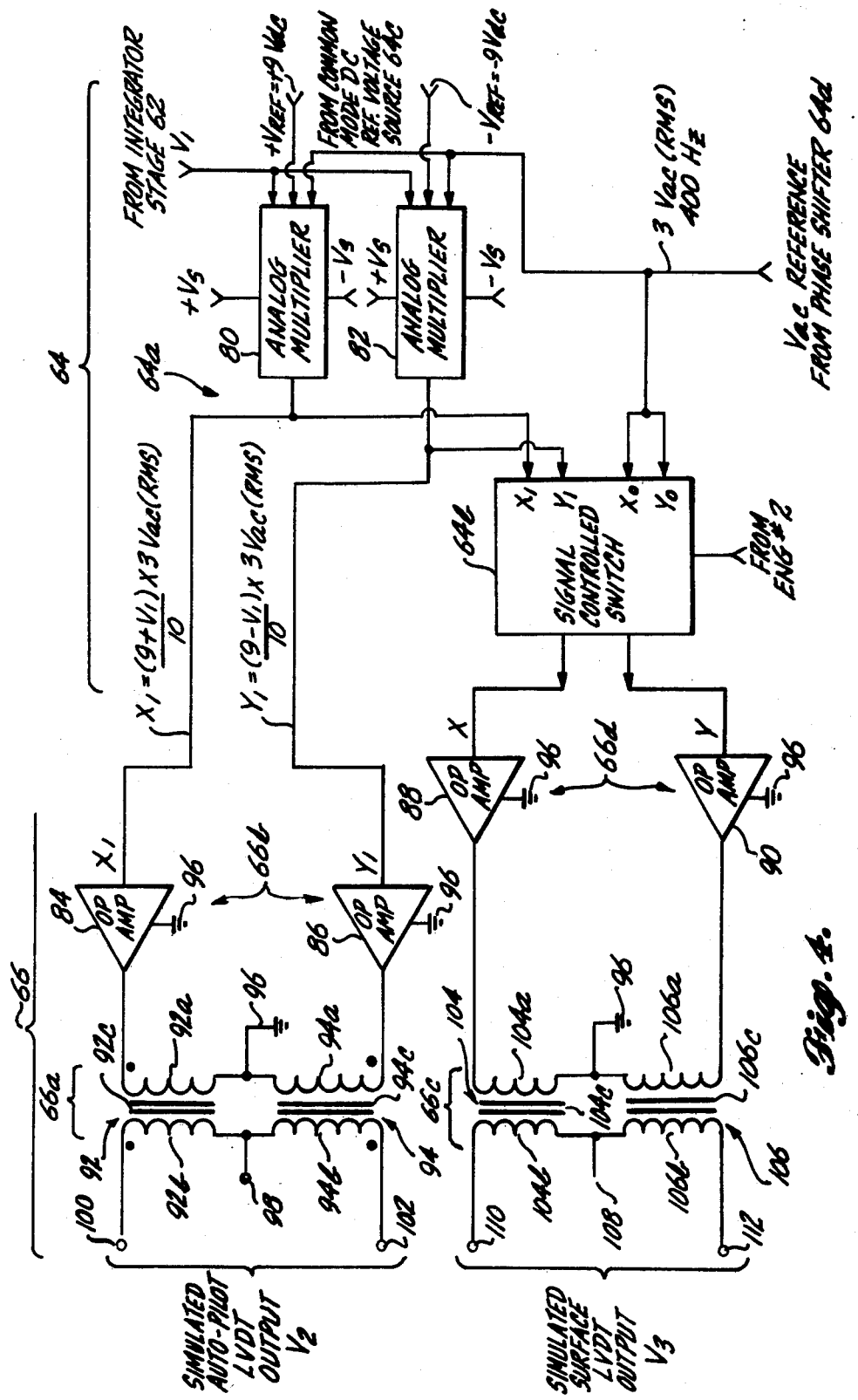
FIG. 4 is a schematic diagram of the output stages including the output transformers of the dual output channel simulator circuit of FIG. 3.

With reference to FIG. 1, simulators 10 and 12 are connected, at a test interface, to the aircraft flight control electronics which, in this embodiment, include an autopilot 14 (sometimes called the "flight control computer" or FCC) and control system electronics unit 16 (sometimes abbreviated as CSEU). Simulators 10 as shown in FIG. 1 encompass a plurality of similar circuits 10a, one for each separately controlled, primary surface, and serve to duplicate the response characteristics of the power control actuators and associated LVDT position-sensing transducers. To visually indicate the signal condition of each of simulator circuits 10a, indicator lamp panels 10b are provided. The primary control surfaces of the aircraft simulated by simulators 10 include the ailerons, elevators, and rudder. Simulators 12, including circuits 12a and indicator lamp panels 12b, duplicate the response characteristics of the power control actuators and LVDT position-sensing transducers that cooperate with the secondary control surfaces which include the spoilers, stabilizers, trim tabs, flaps, and slats. To understand the cooperation of simulators 10 and 12 with autopilot 14 and CSEU 16, reference is made to FIG. 2, which is a block diagram of an existing (prior art) flight control system including the actual, aircraft-mounted actuators, position-sensing LVDT transducers, and control surfaces that are under the control of autopilot 14 and CSEU 16.

Thus, in FIG. 2, the dotted line block 10' encompasses those components of the aircraft control system that are simulated by circuits 10. In this embodiment, such components include the primary control surfaces 20, a plurality of power control actuators 22, a corresponding plurality of surface position LVDTs 24 acting in concert with the output of the actuators 22 and hence with the movement of the primary control surfaces 20, and a corresponding plurality of autopilot position LVDTs 26. The latter LVDTs respond to the positioning of autopilot actuator pistons that are mounted internally of power control actuators 22 for providing one set of piloting input commands to actuators 22.

More specifically, power control actuators 22 receive commands from two different sources. A first source of commands is provided by mechanical linkage inputs received from the manual pilot controls 28 which include, for example, the control column, rudder pedals, et cetera. Controls 28 are mechanically linked to internal mechanisms, such as crank members, within actuators 22 that convert the mechanical input commands into movement of the corresponding primary control surfaces. A second source of commands is provided by autopilot 14 in the form of electrical control signals applied over bus 30 and received by electrohydraulic servovalves and associated actuator pistons within control actuators 22 for converting the autopilot electrical commands into mechanical movements that position the control surfaces.

During manual flight, pilot controls 28 dominate the operation of actuators 22, unfettered by conflicting electrical input commands from autopilot 14. During this manual piloting mode, the autopilot is disabled by physically disengaging the autopilot actuator pistons by retracting electrohydraulically operated detents that are subcomponents of power control actuators 22 and are operated by signals received over bus 30. To change from manual flight to autopilot control, a sequence of electrical command signals is generated and applied to actuators 22 to cause the autopilot command signals to agree with the existing manual, mechanical input before engagement of the autopilot actuator pistons by the above-mentioned electrohydraulic detents.

Still in reference to FIG. 2, surface position LVDTs 24 are connected to either the surface-positioning mechanical movement at the output of actuators 22, or to control surfaces 20 themselves and respond to the actual position of the control surfaces 20 irrespective of the input commands to actuators 22. As described below, LVDTs 24 produce position feedback signals that are communicated over bus 32 to autopilot 14, and are in the form of a varying amplitude and phase-alternating current (AC) signal. Autopilot position LVDTs 26 are mechanically coupled, internally of actuators 22, to the autopilot actuator pistons and respond to these pistons for producing status feedback signals that are communicated over bus 34 to autopilot 14. Both sets of feedback LVDTs 24 and 26 operate by accepting an AC reference signal and outputting an altered amplitude and phase AC feedback signal that represents the changed position of the monitored control surface as more fully described hereinafter. Also, the feedback signals generated by surface LVDTs 24 and autopilot LVDTs 26 are compared during the above-mentioned transition from manual to autopilot flight so as to prevent an abrupt shift in the input commands to actuators 22 that might result in a sudden and dangerous movement of the control surfaces 20.

The components circumscribed by dotted line block 12' of FIG. 2 include the secondary control surfaces 40, such as the aircraft spoilers, the surface-positioning power control actuators 42 for the secondary surfaces, and the corresponding surface position-sensing LVDTs 44. These components are replaced by simulators 12 of FIG. 1 for testing autopilot 14 and CSEU 16.

The simulated components of block 12', associated with the secondary control surfaces, differ from those of block 10' described above in that power control actuators 42 do not incorporate a separate autopilot actuator piston and hence the additional feedback channel provided by the autopilot position LVDTs 26 of the block 10' is absent in the secondary control surfaces block 12'. Only the positions of secondary control surfaces 40 need monitoring and that function is performed by the surface position LVDTs 44 which are linked to the mechanical outputs of actuators 42. Another difference is that the commands for positioning the secondary control surfaces 40, such as the spoilers, are in the form of electrical command signals produced by CSEU 16 and applied to the secondary power control actuators 42 over signal bus 46. The electrical command signals applied via bus 46 are converted by electrohydraulically operated servovalves and associated actuator mechanisms, such as actuator pistons, provided within the power control actuators. The electrical command signals produced by CSEU 16 are derived indirectly from either secondary pilot controls 48, such as the spoiler/speed brake lever shown coupled to CSEU 16 by dotted line linkage 50, or from autopilot 14 in the form of electrical control signals communicated over bus 52. As in the case of LVDTs 24 and 26, surface position LVDTs 44 communicate a variable amplitude and phase AC signal as feedback of the surface position to CSEU 16 over bus 45.

As mentioned, position command signals for the secondary control surfaces are produced by CSEU 16, either in response to manual pilot controls 48, or indirectly by autopilot 14 (FIG. 2). In the latter case, the autopilot 14 is the source of such command signals for deploying the secondary surfaces, such as the spoilers, in coordination with primary surfaces such as the ailerons for augmenting the flight control functions of the primary surfaces in a manner well known in the design of aircraft controls.

Now referring again to FIG. 1, simulators 10 and 12 are connected to autopilot 14 and CSEU 16 at the indicated test interface 14 for electrically simulating the primary and secondary control surfaces 20 and 40, power actuators 22 and 42 and position-sensing LVDTs 24, 26 and 44 under dynamic, closed-loop operation. Simulators 10 and 12 are thus useful in verifying the operation and integrity of the flight control electronics and instrumentation in a laboratory or other test environment. Technicians can perform closed-loop system checks without installing and/or connecting the actual control surfaces, power actuators and position-sensing LVDTs to the autopilot and CSEU. The operability of these latter electronic subsystems is thus verified without visual monitoring of the surface positions or movement of the various hydraulically operated, internal and external components of the power control actuators.

Figure 3:
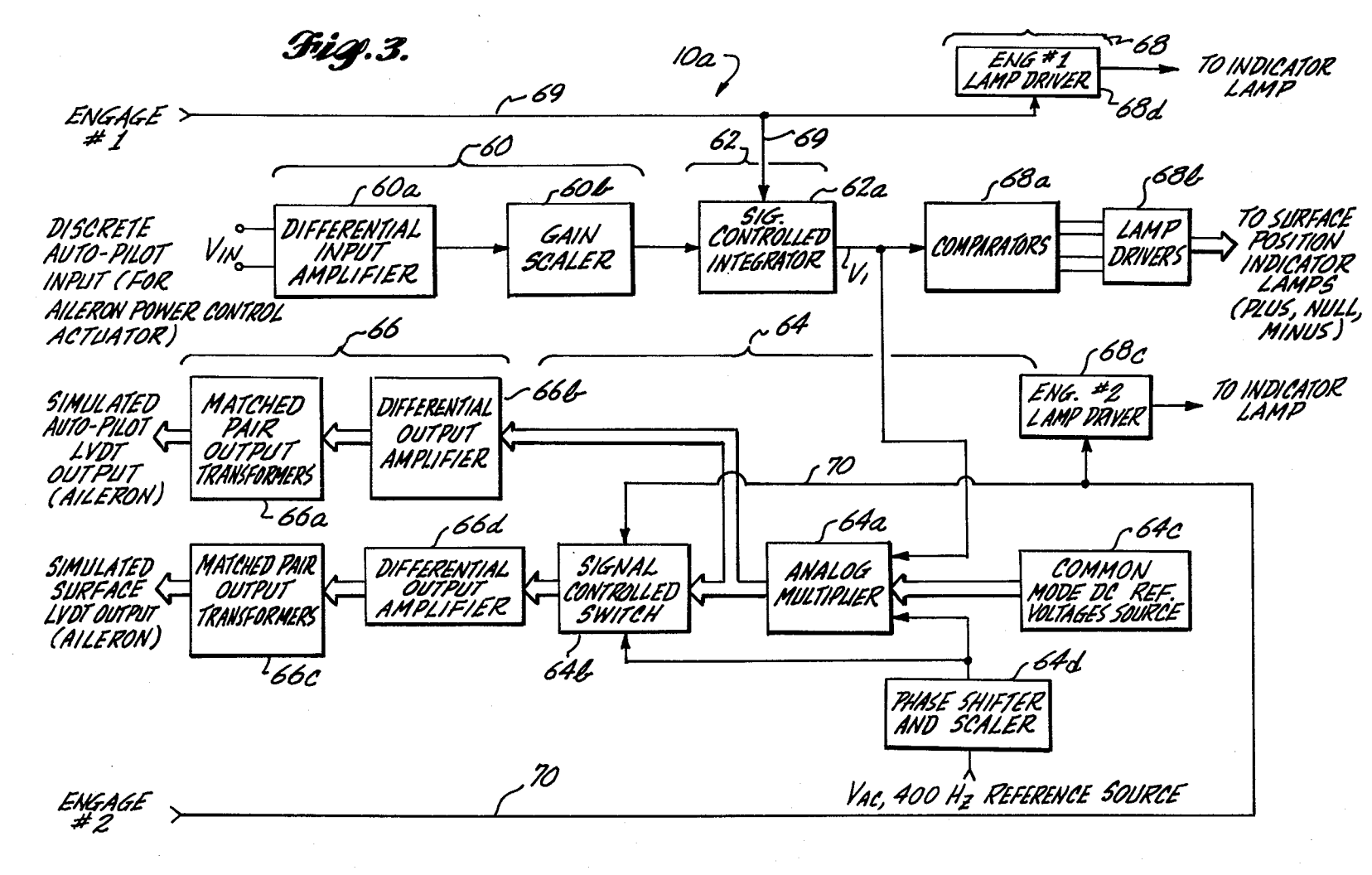

As described more fully below in connection with FIGS. 3 and 4, which detail the construction of one of the simulator circuits 10a, and in connection with FIGS. 7 and 8 detailing one of simulator circuits 12a, an aspect of the invention is the use of matched pairs of output transformers, differentially driven at their primaries by a modulated AC signal, to closely simulate, at the secondaries of such transformers, the operation and impedance characteristics of the actual position-sensing LVDTs 24, 26, and 44 of FIG. 2. To understand the relationship between the simulated LVDTs and the output transformers of the simulator circuits 10a and 12a, it is helpful to explain the construction and functioning of a standard LVDT device. Each LVDT is comprised of a primary winding, a movable ferromagnetic slug, and a pair of output or secondary windings, connected in series-bucking (opposing) relation. Typically, the primary and secondary windings are wound to form a hollow cylindrical shape and the slug is positioned coaxially therewith and mounted for reciprocating movement along the axis of the structure, with one end of the slug being axially extended to serve as a position-sensing, mechanical probe of the LVDT device.

An alternating current reference signal of known phase is applied to the primary winding and the signal is variably coupled through the movable ferromagnetic slug to the series-opposed secondary windings such that when the slug is in a centered or null position, the coupling is equal and opposite to produce a net output of zero volts when measured across the series-connected, opposing secondary windings. When the slug is displaced from the null position toward one axial end of the device, a disproportionately larger signal is induced in one of the secondary windings, relative to the other, and the resulting output, when measured across the serially connected secondaries, is of a magnitude that is proportional to the amount of displacement of the slug. Furthermore, the polarity (phase) of the output signal will be either in phase with the reference AC signal, indicating one direction of slug displacement relative to the centered or null position, or 180° out of phase with the AC reference signal, indicating displacement in the opposite direction. Thus, the magnitude of the output signal from the series-opposed secondary windings represents the amount of slug movement and the phase of the output signal represents the direction of movement.

With reference to FIG. 3, a detailed block diagram of one of the simulator circuits 10a of simulators 10 (FIG. 1) is shown. The illustrated circuit is used for simulating primary control surfaces, such as the ailerons, and the corresponding power actuators and LVDTs, and is sometimes called a dual channel simulator because of its dual LVDT outputs needed for the reasons described herein. In practice, a plurality of circuits similar or, in some cases, identical to circuit 10a are used to simulate the ailerons, elevators, and rudder, all of which require two LVDT output channels, one for sensing the control surface position and the other for sensing the existing position of the autopilot actuator piston. The number of primary surface simulator circuits 10a required for any given application depends on the nature of the test and on the type of aircraft controls that are being simulated. For example, in one embodiment, the ailerons, elevators, and rudder surfaces each require three such simulator circuits. Additional simulator circuits, such as 10a, may be used for multisurface mixing controls found on commercial carrier aircraft, including pitch, yaw, damper, and rudder ratio controls.

Simulator circuit 10a incorporates an input stage 60, an integrator stage 62, an AC signal modulator stage 64, and a simulated LVDT output stage 66. Additionally, a display driver stage 68, including comparators and lamp drivers, is provided for generating lamp-energizing signals for display of the simulated surface positions on surface position indicator panel 10b indicated in FIG. 1 and shown in greater detail in FIG. 6.

Figure 5:
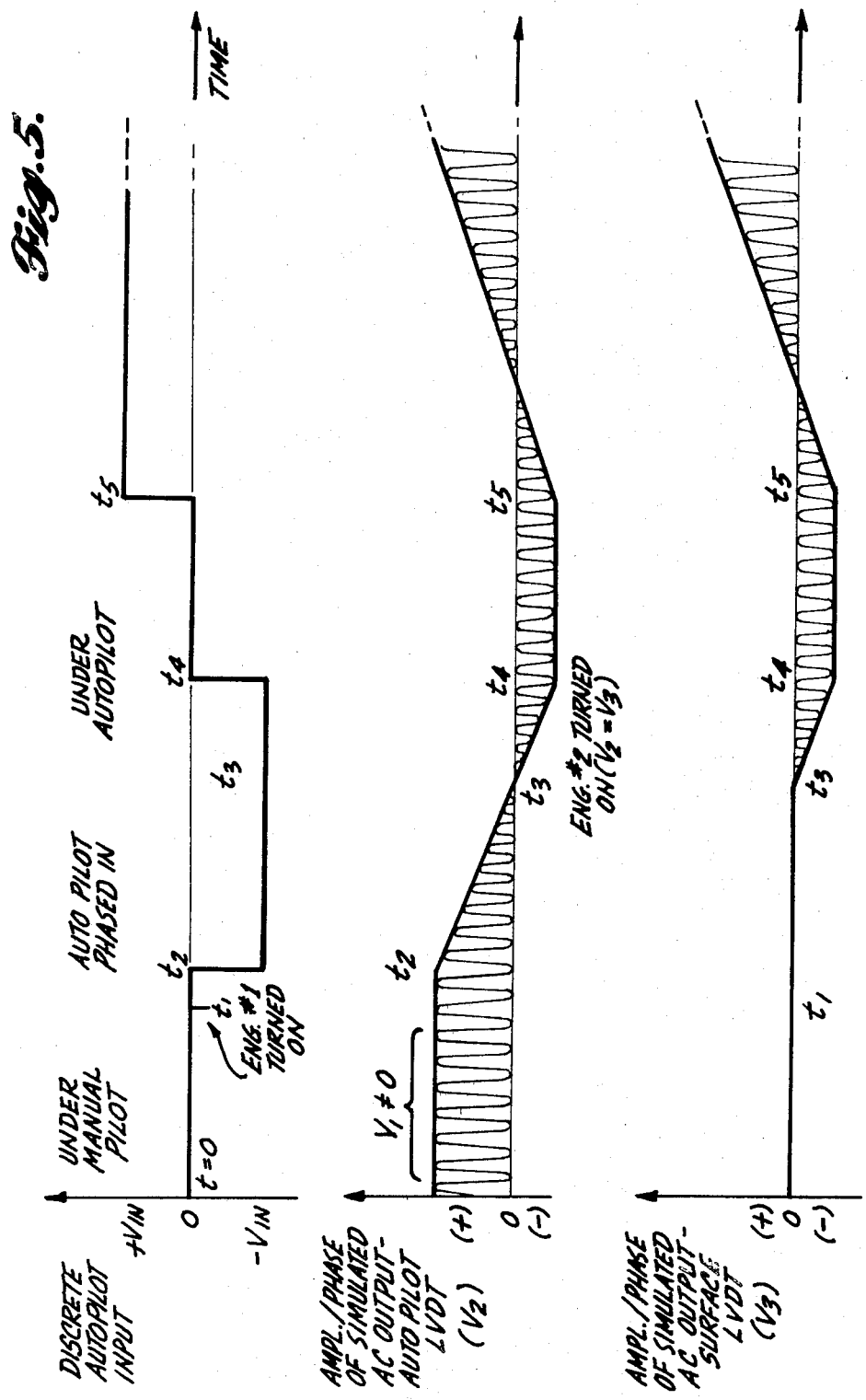
FIG. 5 is a set of waveform diagrams illustrating certain signal conditions of the circuits of FIGS. 3 and 4.

Input stage 60 of circuit 10a of FIG. 3 receives a discrete level, bipolarity control signal from the autopilot for commanding a desired position of the aileron. This autopilot input signal is shown in FIG. 5 to have three discrete levels: a relatively positive valve $V_{in}$ (e.g., +8 volts); zero; and a relatively negative valve $V_{in}$ (−8 volts). The signal is differentially applied such that in the relatively positive condition a $+V_{in}$ will be present at one input terminal and a $-V_{in}$ will be present at the other terminal, with the opposite polarities present at these terminals when the opposite command condition exists, and zero volts across the terminals for a hold steady command. With further reference to FIG. 5, the autopilot input signal is shown to be initially zero, commanding a steady or unchanged position of the aileron; then stepping to $+V_{in}=8$ volts for commanding the aileron surface to rise; and then stepping to $-V_{in}$ to lower the aileron surface. With reference to FIG. 3, these discrete level input signals are amplified in the input stage 60 by differential input amplifier 60a and then appropriately scaled in magnitude by gain scaler 60b to produce a modified signal having the same configuration as the input command signal and varying both positively and negatively with respect to zero.

Integrator stage 62 functions as a ramp generator and for this purpose includes a signal controlled integrator 62a. When enabled by an input signal received over lead 62b, it integrates the autopilot command signal as modified by input stage 60 to produce a ramping signal that increases linearly with time for relatively positive conditions of the input command signal, and decreases linearly with time for relatively negative command signal conditions, and remains flat when the input command signal is zero or a control signal on lead 69 has disabled integrator 62a. The ramp signal generated at the output of integrator 62a simulates the relatively slow response of the hydraulic components of the power actuator. The slope of this ramp signal can be adjusted to match the response time of the simulated hydraulic actuator by changing a resistive capacitive time constant (not shown) in integrator 62a. The purpose of the control signal lead 69 will be described below and for the present purposes it will be assumed that integrator 62a is enabled.

Modulator stage 64 modulates the amplitude of an alternating current reference signal according to the integrated command signal for differentially driving matched pairs of output transformers of output stage 66 so as to simulate the autopilot LVDT and surface LVDT output signals. Stage 64 includes an analog multiplier 64a, a signal-controlled switch 64b, a fixed phase shifter and scaler 64d, and a source of DC reference voltages 64c. Modulator stage 64 combines an AC reference signal, received through phase shifter and scaler 64d, with DC reference voltages from source 64c and forms differential AC signals in which the difference therebetween varies as a function of the integrated command signal received from stage 62. The differential AC signals are applied to differential output amplifiers 66b and 66d, the latter through switch 64b, to drive the two sets of matched pairs of output transformers 66a and 66c in a manner that simulates the displacement of the movable ferromagnetic slug in LVDT transducers. Phase shifter and scaler 64d introduces a fixed phase shift in the AC reference signal to compensate for a corresponding, fixed phase shift in the actual, simulated position-sensing LVDTs 24 and 26 of block 10' (FIG. 1). The preferred embodiment of these components is shown in greater detail in FIG. 4 and their operating characteristics will be described in connection with that FIGURE.

Output stage 66 is formed by two output channels, one for the simulated autopilot LVDT output and the other for the simulated surface LVDT output. The autopilot output channel incorporates a matched pair of output transformers 66a, driven differentially by differential output amplifiers 66b in response to the output of analog multiplier 64a. Similarly, the surface LVDT output channel includes another pair of output transformers 66c differentially driven by differential amplifiers 66d in response to the modulated AC output of analog multiplier 64a or in response to the unmodulated AC reference signal, depending on the state of switch 64b. The state of switch 64b is controlled by a signal applied to control lead 70 as described below.

Figure 6:
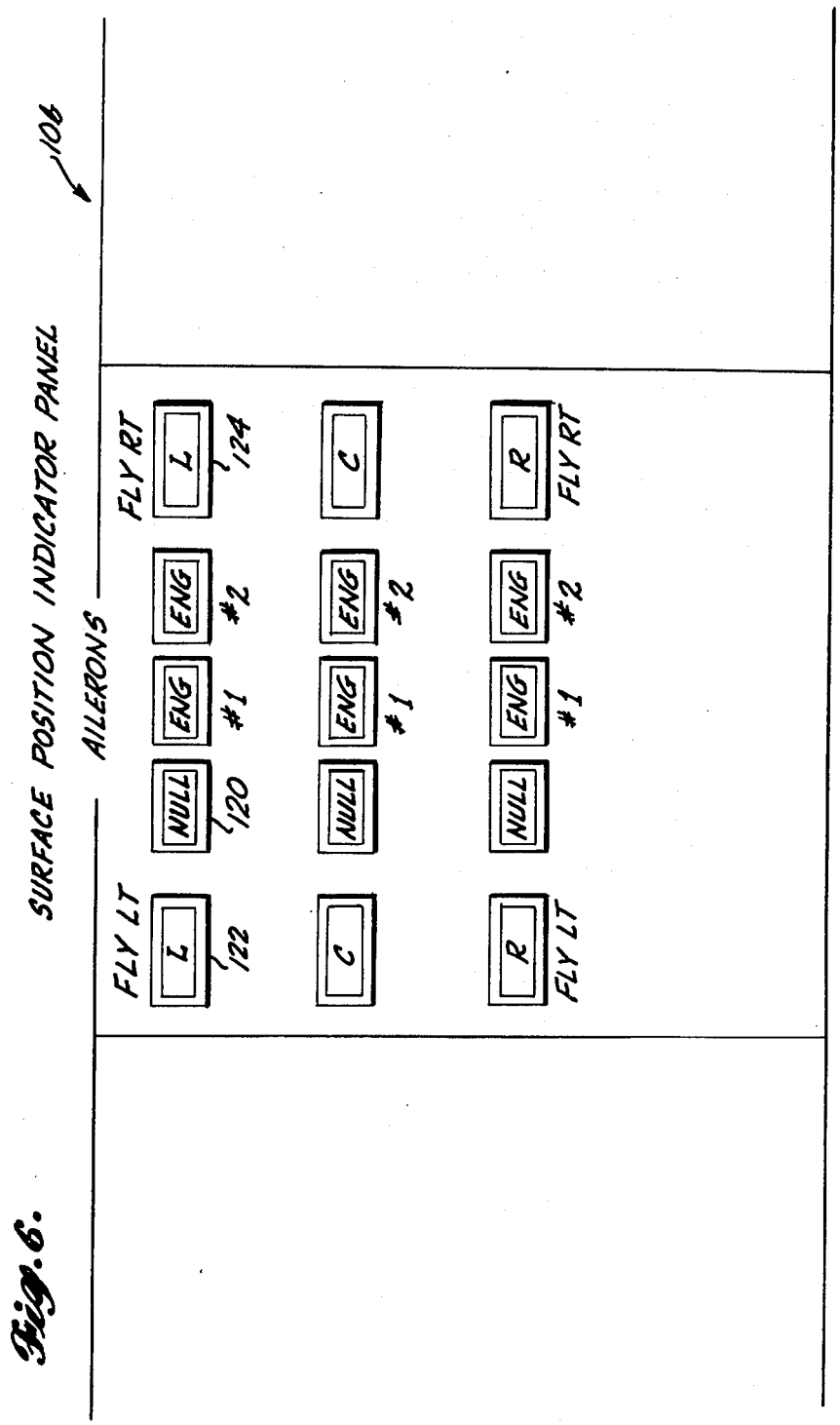
FIG. 6 is a front view of a display panel formed by an array of surface position indicator lamps for indicating the dynamic test conditions of the simulator circuit of FIGS. 3 and 4.

Stage 68 includes a bank of comparators 68a to decode the amplitude and polarity of the integrated command signal from stage 62, and a plurality of lamp drivers 68b responsive to the comparator 68a for selectively energizing the indicator lamps of panel 10b (FIG. 6) to show the direction of movement of the simulated aileron positions. Stage 68 also incorporates lamp drivers 68c and 68d, respectively, responsive to engage No. 1 and engage No. 2 control signals for indicating the condition of these signals on panel 10b (FIG. 6).

In the actual power control actuator 22 of FIG. 2, engage No. 1 and No. 2 control signals are sequentially generated during transition from manual to autopilot flight for phasing in the autopilot command input. Engage No. 1 is a discrete control signal, generated by a pilot-operated switch in the cockpit, which operates a fluid valve for supplying pressurized fluid to the autopilot actuator piston in the power control actuator. The positioning of such autopilot piston is then responsive to servovalve acting under the control of an autopilot command signal from autopilot 14 to drive the autopilot piston to a position agreeing with the manual pilot (mechanical) input. A feedback signal from the autopilot LVDT 26 (FIG. 2) is compared with the actual surface position reflected in the output of surface LVDT 24, and when these two feedback signals agree, autopilot 14 generates a discrete control signal, called engage No. 2. The latter signal operates the above-mentioned electrohydraulic detents within the power control actuator 22 causing the autopilot piston to be engaged with the actuator mechanism, and to thereby assume control over the power actuator without causing an abrupt change in control surface position.

In the case of simulator circuit 10a (FIGS. 1 and 3), the engage No. 1 control signal turns on (enables) integrator 62a to simulate the enabling or arming of the electrohydraulically controlled autopilot actuator piston. The autopilot command signal $V_{in}$ now drives simulator circuit 10a (via integrator, modulator and output stages 62, 64 and 66, respectively) until it produces at the simulated autopilot LVDT output a feedback signal that agrees with the simulated surface position as represented by the simulated surface LVDT output of stage 66. When agreement of these LVDT feedback signals is detected by autopilot 14 (FIG. 1), the engage No. 2 control signal is generated by autopilot 14 and applied to control lead 70 to operate switch 64b to apply the same modulated differential AC signal to both output channels of stage 66.

FIG. 4 illustrates in greater detail the modulator and output stage 64 and 66, respectively, and shows that analog multiplier 64a is provided in this embodiment by a pair of separate analog multiplier devices 80 and 82 which receive the integrated command signal $V_1$ (here varying from $-5.8$ V to $+5.8$ V) from stage 62, a phase-shifted and scaled reference AC voltage, e.g., 3VAC (RMS) at 400 Hz., and equal but opposite polarity DC reference voltages, plus and minus $V_{REF}$, e.g., ±9 volts DC. The output signals from multiplier devices 80 and 82, represented by the signals $x_1$ and $y_1$, provide differential, alternating current signals represented by the formulas:

$$x_1 = \left[\frac{(9 + V_1)}{10}\right] \times 3\text{VAC(RMS)}, \text{ and}$$

$$y_1 = \left[\frac{(9 - V_1)}{10}\right] \times 3\text{VAC(RMS)},$$

where these relationships are derived by devices 80 and 82 in response to the three inputs applied to each multiplier device. In effect, output voltages $x_1$ and $y_1$ represent common-mode alternating current voltages which are equal in magnitude and phase when the integrated signal $V_1=0$, and diverge, differentially in proportion to changes in the magnitude and polarity of the integrated command signal $V_1$.

The modulated, differential AC voltages represented by $x_1$ and $y_1$ are applied directly to differential output amplifier 66b associated with the matched pair of output transformers 66a, and are connected in parallel to one set of inputs of signal-controlled switch 64b for selectively applying these same signal components to the differential output amplifier 66d associated with the matched pair of output transformers 66c. Switch 64b has an additional set of inputs $x_o$ and $y_o$ which receive the unmodulated AC reference signal. Thus, switch 64b alternately applies either the differential, modulated AC reference signal represented by $x_1$, $y_1$, or the unmodulated, common-mode AC reference voltage represented by $x_o$, $y_o$. The output leads from switch 64b are represented by x and y and are applied to a pair of operational amplifiers 88 and 90 connected as differential amplifier 66d.

The first pair of matched output transformers 66a for simulating the autopilot LVDT output is provided by a first transformer 92 including a primary winding 92a, a secondary winding 92b and a core 92c; and by a second transformer 94 having a primary winding 94a, a secondary winding 94b and a core 94c. Transformers 92 and 94 are separate devices without electromagnetic cross-coupling between windings; in other words, core 92c couples primary winding 92a only with secondary winding 92b and similarly, core 94c couples primary winding 94a only with secondary winding 94b. As such, the transformers 92 and 94 can be separate devices with their windings connected as shown and described below, or they can be physically packaged in a common casing as long as the magnetic cores 92c and 94c do not cause cross-coupling of the signals. Primary winding 92a of transformer 92 is connected to receive the output of operational amplifier 84, namely the $x_1$ component of the modulated differential AC signal in which the grounds indicated at 96 complete the circuit. Similarly, primary winding 94a of the other transformer 94 is connected to receive the output of operational amplifier 86, namely the component $y_1$ of the modulated, differential AC signal, in which the grounds 96 complete the circuit between amplifier 86 and winding 94a. Secondary windings 92b and 94b of transformers 92 and 94 are connected in series-bucking relationship with the physically innermost leads connected to a common terminal 98 and the outermost leads of the secondary windings being extended respectively to terminals 100 and 102. The voltage developed across these outermost terminals 100, 102 forms the simulated autopilot LVDT output voltage represented by $V_2$.

Similarly, the matched pair of output transformers 66c is shown in FIG. 4 to include a first transformer 104 having a primary winding 104a, a secondary winding 104b, and a coupling core 104c; and a second transformer 106 having a primary winding 106a, a secondary winding 106b, and a core 106c. Primary winding 104a is connected across the output of operational amplifier 88 to receive the signal component x from switch 64b, and the primary 106a of transformer 106 is similarly connected across the output of operational amplifier 90 to receive the component y from switch 64b wherein both circuits are completed through a ground 96 tied to the innermost ends of primary windings 104a and 106a as shown. The secondary windings 104b and 106b are connected in series-bucking relationship with the junction therebetween being tied to terminal 108 and with the outermost leads being extended to terminals 110 and 112, across which the simulated surface LVDT voltage output, represented as $V_3$, appears.

The simulated autopilot LVDT output $V_2$ at terminals 100, 102, is connected over bus 34 (FIG. 1) to autopilot 14 and, similarly, the simulated surface LVDT output $V_3$ at terminals 110, 112 of stage 66 of FIG. 4 is communicated over bus 32 to the autopilot 14 (FIG. 1). In this embodiment, the common junctions at terminals 98 and 108 between the secondary windings are similarly accessed and communicated over buses 34 and 32, respectively, to autopilot 14 for the purpose of performing continuity tests on the individual secondary windings. However, it will be recognized that some applications of the simulator do not require connection of the common terminals 98 and 108 to autopilot 14.

The operation of simulator circuit 10a of FIGS. 3 and 4 will be explained with additional reference to the waveform diagrams of FIG. 5. With reference to the first (uppermost) waveform in FIG. 5, it is assumed that at time $t=0$, the aircraft is under manual pilot flight and hence the ailerons and other control surfaces of the aircraft are positioned through the mechanical linkage components of power control actuators 22 (FIG. 2). In this condition, the autopilot is disengaged and the autopilot transition or phase-in signals engage No. 1 and engage No. 2 are in an OFF electrical state. It is further assumed that the aileron command signal, $V_{in}$, from autopilot 14 is zero. With reference to FIG. 4, during these initial conditions under manual pilot, the simulated autopilot LVDT output $V_2$ may be at some nonzero value, representing a residual, integrated command signal $V_1$ from a charge stored in integrator stage 62. This nonzero condition is indicated by the waveform for $V_2$ shown in FIG. 5 between $t=0$ and $t_1$. The output voltage $V_2$ is an AC signal resulting from the unbalanced components $x_1$ and $y_1$ produced in the modulator stage 64 (FIG. 4) which causes one of the pairs of transformers 66a to have a secondary output voltage that dominates the voltage on the other secondary of the pair resulting in a net AC signal output for $V_2$ across terminals 100, 102. Further still, the simulated surface LVDT output $V_3$ at the output of matched transformers 66c is zero during this time period from $t=0$ to $t_1$ because signal control switch 64b is in a state, determined by the engage No. 2 signal, that connects the balanced, common-mode input voltages $x_o$, $y_o$ from the reference source to the differential amplifier 66d which hence drives both transformer primaries equally and the secondaries equally and oppositely to cancel any voltage output across terminals 110, 112. Thus, as shown in FIG. 5, during the time interval $t=0$ through $t_1$, the net output voltage $V_3$ is equal to zero.

Now, it is assumed that at time $t_1$, the pilot initiates a transition from manual to autopilot flight and for this purpose operates a switch in the cockpit that turns the engage No. 1 signal ON at time $t_1$ to commence phasing in autopilot control. With reference to FIG. 3, the engage No. 1 signal is applied to simulator circuit 10a at control lead 69 to enable integrator stage 62 and hence integrator 62a. Thereafter, integrator 62a integrates the input level of the discrete autopilot input command $V_{in}$ received at input stage 60 and applies the integrated command signal $V_1$ to modulator stage 64. Immediately after the integrator stage is turned on by the signal engage No. 1, autopilot 14 (FIG. 1) compares the levels of the simulated autopilot LVDT output voltage $V_2$ with the simulated surface LVDT output voltage $V_3$, both available from output stage 66.

In the example of FIG. 5, a difference exists between $V_2$ and $V_3$ at time $t_1$ as represented by the positive value of $V_2$ compared to the zero value of $V_3$. Responsively, autopilot 14, sensing the magnitude and polarity of the difference between $V_2$ and $V_3$, generates and autopilot command signal of the proper sense (polarity) for correcting the difference. In the example of FIG. 5, the autopilot LVDT output voltage $V_2$ is at a relatively positive level compared to the zero value of the simulated surface LVDT output $V_3$, and consequently, a negative, discrete autopilot command signal $-V_{in}$ is produced at a time $t_2$ shortly after the engage No. 1 signal turns on integrator stage 62 (FIG. 3). The $-V_{in}$ autopilot command signal is now passed through input stage 60 to integrator stage 62, where integrator 62a ramps negatively, with the resulting negatively integrated output voltage $V_1$ being applied to modulator stage 64.

Analog multiplier 64a responsively decreases the differential between $x_1$ and $y_1$ (FIG. 4) so that the simulated autopilot LVDT output voltage $V_2$ at terminals 100, 102 of output stage 66 decreases in the fashion shown in FIG. 5 during the time interval $t_2$ through $t_3$. At time $t_3$, the amplitude of the AC voltage output signal $V_2$ has decreased in response to the downwardly ramping command signal $V_1$ acting through modulator stage 64 to a level at which $V_2$ equals $V_3$ which is still at zero in accordance with the initial conditions referred to above.

When the simulated autopilot LVDT output voltage $V_2$ equals the simulated surface LVDT output voltage $V_3$ at time $t_3$, autopilot 14 detects the condition and generates the second autopilot phase-in signal, engage No. 2, which changes the state of switch 64b so that the inputs $x_1$, $y_1$ from analog multipliers 80 and 82, respectively, are selected to appear at the outputs x, y, of switch 64b for driving differential amplifier 66d and the matched pair of output transformers 66c. After the engage No. 2 signal has been received by simulator circuit 10a, both the simulated autopilot LVDT and the simulated surface LVDT outputs $V_2$, $V_3$, respectively, track the same modulated outputs developed by multipliers 80 and 82 in response to the ramping, integrated command signal $V_1$ (FIG. 4). In FIG. 5, during the interval from time $t_3$ through $t_4$, both outputs $V_2$ and $V_3$ continue to decrease, this time in a negative ramp, in response to the continued integration of the negative autopilot command signal $-V_{in}$. Note that as $V_2$ and $V_3$ pass through zero and swing negative, a 180°, phase shift occurs in the output phase (or polarity of signal $V_2$) indicating that the dominant signal is now being developed across the secondary winding that is out of phase with the AC signal applied at the primaries. This transition in phase simulates the operating condition of an LVDT in which the ferromagnetic slug of the transducer passes through the null position and the output signal changes phase to reflect the direction of slug movement. Time $t_3$ also coincides with the occurrence in the actual power control actuator 22 (FIG. 2), at which the autopilot actuator piston has been driven by the autopilot command input signal, to a position that agrees with the actual surface position and the electrohydraulically operated detents are operated to effect the engagement of the autopilot control.

After time $t_3$, the autopilot is controlling flight through the power control actuator and this operating condition is simulated by the tracking of the two simulated LVDT output signals $V_2$ and $V_3$. At a time $t_4$, it is assumed that the autopilot generates, on its own, a command to hold the position of the ailerons, and for this purpose the discrete autopilot input command signal $V_{in}$ steps to zero. When this occurs, integrator stage 62 (FIG. 3) stops ramping and holds at its present value, which in turn causes the outputs $x_1$, $y_1$ from modulator stage 64 to similarly hold steady, thus producing AC output signals of constant amplitude for $V_2$ and $V_3$ as shown during the interval $t_4$ through $t_5$. At $t_5$, another command change is received from the autopilot in which there is a step change in $V_{in}$ to a discrete, positive value which reverses the direction of ramping out of integrator stage 62 and causes the simulated LVDT output voltages $V_2$ and $V_3$ to first decrease from a negative phase, through zero and then increase in a positive phase as shown in FIG. 5 until the maximum surface deployment is reached.

The status of the engage No. 1 and engage No. 2 control signals as well as the relative position of the stimulated control surface movements are indicated by the array of lamps on panel 10d shown in FIG. 6. For this purpose, the lamp drivers of stage 68 (FIG. 3) selectively engergize the various lamps (not specifically shown) that are located behind the rectangular boxes shown on the indicator panel for the aileron control surfaces. Panel 10b has three rows of lights, one row for each set of ailerons, left, center, and right, each such row receiving lamp-energizing display signals from one simulator circuit such as 10a shown in FIG. 3. As mentioned above, in this embodiment of the invention, the aircraft ailerons require three identical dual-output simulator circuits, one of which is shown as circuit 10a in FIG. 3.

Panel 10d is shown to include engage No. 1 and engage No. 2 indicator lamps responsive, respectively, to drivers 68b and 68c of circuit 10a as shown in FIG. 3, a null lamp 120 and a fly-left lamp 122 and a fly-right lamp 124, which respectively respond to a $V_1=0$ level, a $V_1$ greater than zero, and $V_1$ less than zero. These lamps accordingly indicate the relative command condition that is applied to the modulator 64 of circuit 10a. For example, when the integrated command signal $V_1$ is equal to zero, the null lamp 120 of panel 10b for the corresponding set of ailerons is lit as a result of the operation of comparators 68a. If $V_1$ swings positive, then lamp 122 would be lit by the output of comparators 68a acting through lamp driver 68d, and similarly, if $V_1$ ramps to a relative negative value, then the fly-right lamp 124 would be energized by comparator 68a and lamp driver 68b.

It is thus appreciated that each of the simulators, including a simulator circuit 10a and indicator panel 10b, enables quick, effective, realistic testing of the autopilot without the trouble, expense, and in some cases, impossibility of interconnecting all of the actual primary control surfaces, power actuators, and position-sensing LVDTs. The matched pairs of output transformers, with their primary windings driven as described above by differential AC signals with the difference being a function of the integrated autopilot command signal, create a natural, realistic signal and impedance interface between the simulator circuit and the autopilot equipment to be tested. The selectively energized lamps of panel 10b permit a quick visual check on the relative signal conditions existing within simulator circuit 10a during the testing procedure.

Figure 7:
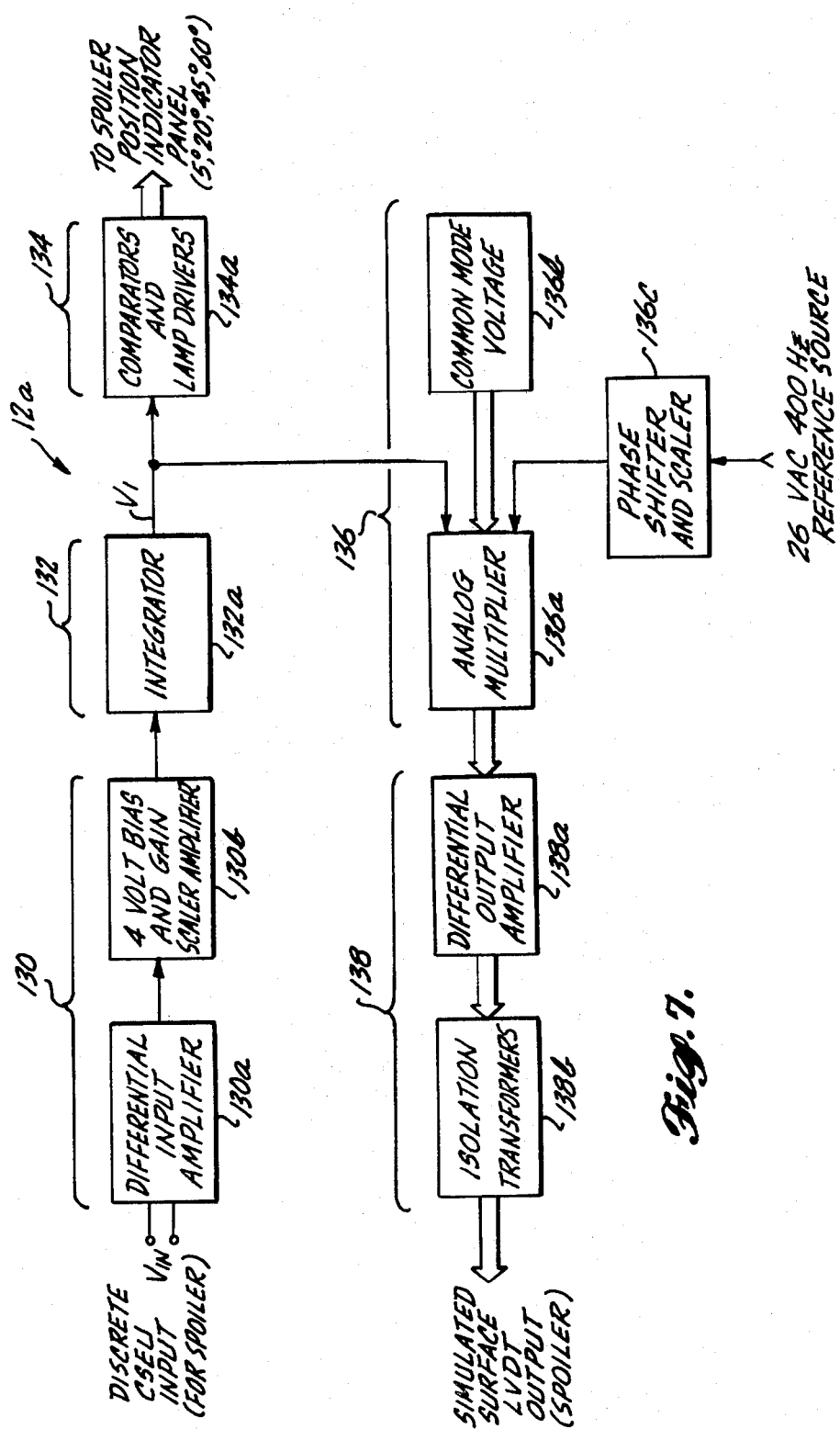
FIG. 7 is a detailed block diagram of another simulator circuit for simulating the operations of secondary control surfaces such as the aircraft spoilers.
Figure 9:
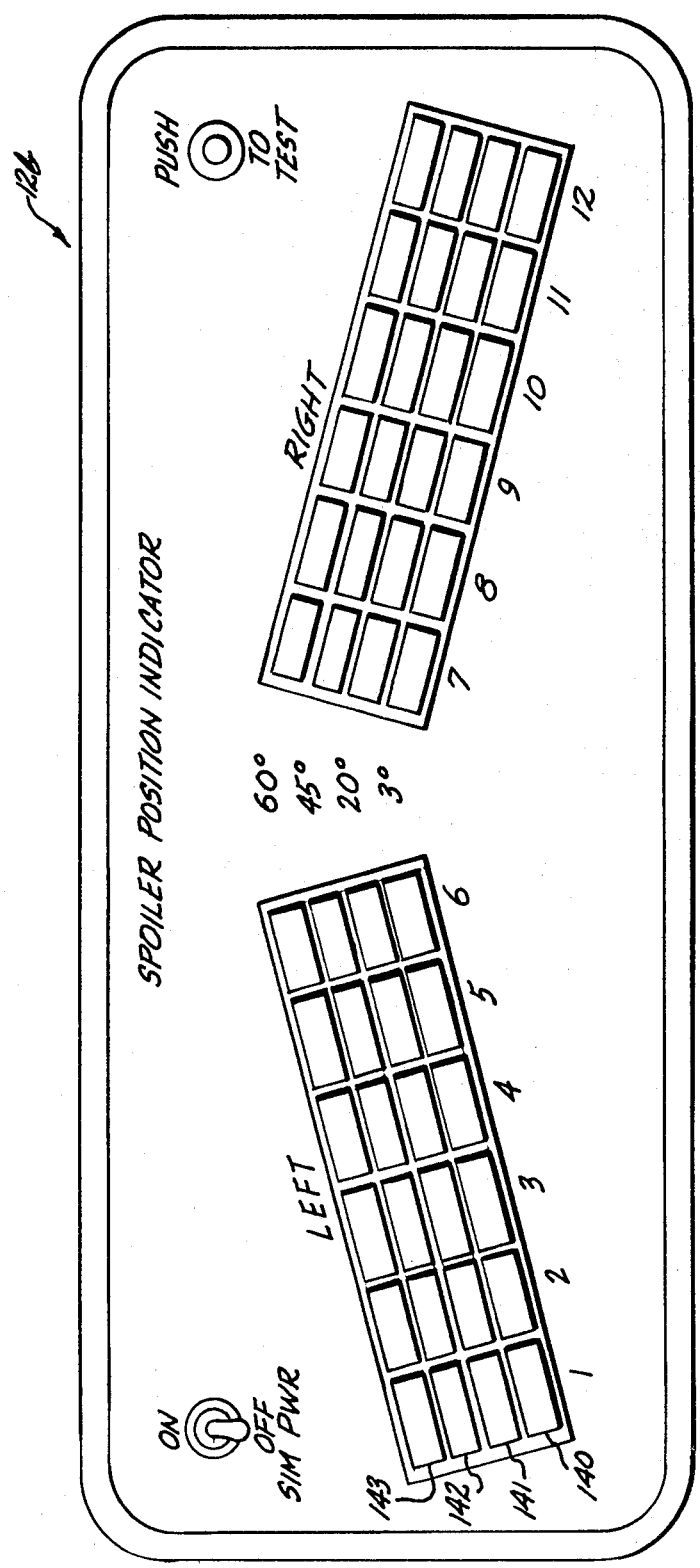
FIG. 9 is a front elevational view of an indicator panel associated with the simulator circuit of FIGS. 7 and 8 for indicating, by an array of indicator lamps, the position of the simulated control surface.

With reference to FIG. 7, a detailed block diagram of an exemplary simulator circuit 12a is shown, one of a plurality used in simulator 12 (FIG. 1), for simulating the secondary control surfaces 40 and the cooperating power control actuators 42 and surface LVDTs 44 of FIG. 2. In this embodiment, circuit 12a is one of a plurality of twelve such circuits; one for each of two groups of spoilers, six on the left wing, and six on the right wing. Together, the twelve separate simulator circuits 12a cooperate with a common spoiler position indicator panel 12b shown in FIG. 9 to indicate, by the arrays of selectively lit lamps, the approximate positions, in degrees, of each of the spoiler control surface segments.

Thus, in FIG. 7, spoiler simulator circuit 12a includes an input stage 130 having a differential input amplifier 130a for receiving the discrete level command signal from CSEU 16 (FIG. 1), and a bias and gain scaler 130b connected in series with the output from amplifier 130a. An integrator stage 132 provided by integrator 132a receives the command signal modified by input stage 130 and develops an integrated spoiler command voltage signal $V_1$. The signal path from the output of the integrator divides into first and second branches. The first branch supplies the integrated command $V_1$ to a display driver stage 134 incorporating comparators and lamp drivers 134a formed by circuits similar to comparators 68a and lamp driver 68b of circuit 10a described above in connection with FIG. 3.

A second branch feeds the voltage output signal $V_1$ from integrator 132a to a modulator stage 136 which incorporates an analog multiplier 136a, a source of DC reference voltages 136b, a fixed phase shifter 136c, and a source of AC reference voltage, which in this embodiment is at 400 Hz and corresponds to the reference source used in simulator circuit 10a, described above. Analog multiplier 136a has a plurality of inputs for jointly receiving the integrated command voltage $V_1$, the DC reference voltages from source 136 and a fixed phase-shifted AC reference voltage at 400 Hz through phase shifter and scaler 136c. Differential, modulated AC reference voltages are produced by stage 136 which are applied to output stage 138 of circuit 12a formed by differential output amplifier 138a and by a matched pair of output transformers 138b. The voltage signal output from transformers 138b represents the simulated surface LVDT output for the corresponding spoiler surface.

Figure 8:
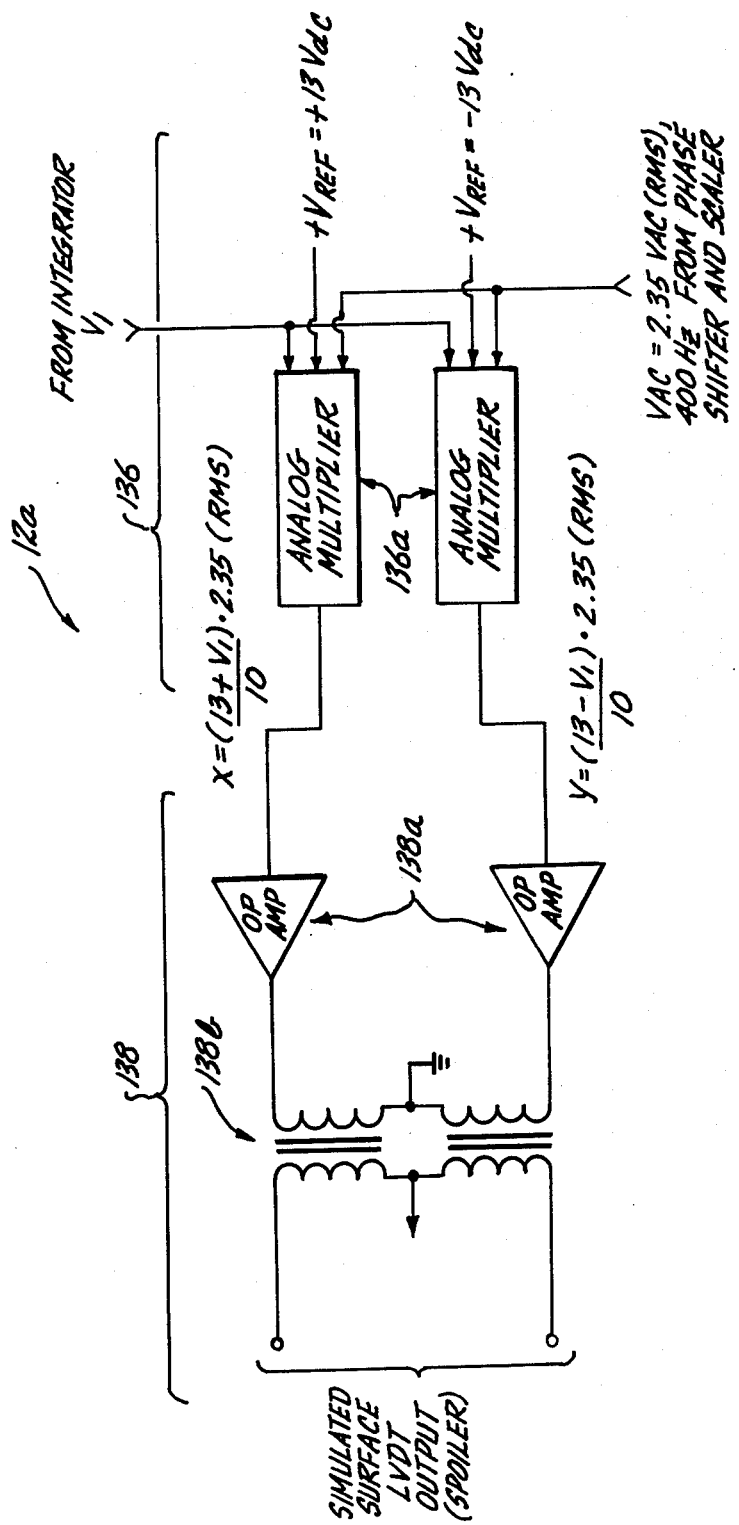
FIG. 8 is a schematic diagram of the output stage of the spoiler simulator circuit of FIG. 7.

The circuitry for certain components of modulator and output stages 136 and 138, respectively, is shown in FIG. 8 and it will be observed that the modulator and output stages are similar in construction to one of the output channels of simulator circuit 10a as shown in FIG. 4, but omit the signal-controlled switch 64b of circuit 10a. Accordingly, reference is made to the previous description set forth in connection with FIG. 4 for an explanation of the basic construction and operation of modulator 136 and output stage 138 of the spoiler simulator circuit 12a of FIG. 8.

One difference in the circuitry of FIG. 8, compared to that of FIG. 4, exists in that the voltage range of the integrated command signal $V_1$ from integrator 132a, the levels of DC reference voltages at source 136b, and the amplitude of the AC reference voltage from the output of phase shifter and scaler 136c all differ from the corresponding levels given as examples in connection with modulator and output stages 64 and 66, respectively, of FIG. 4. Specifically, and by way of example only, the input differential voltage $V_{in}$ varies in discrete steps between a value slightly less than zero, e.g., −2 volts, commanding spoiler retraction; +4 volts, commanding a hold steady position; and +8 volts, commanding the spoilers to rise toward full deployment. As described below, the output voltage $V_1$ from integrator 132a ranges from −7.9 volts to +7.9 volts in response to these discrete input commands that are applied to the input stage 130 of circuit 12a as shown in FIG. 7. The DC reference voltages are +13 volts DC and −13 volts DC, respectively; and the magnitude of the reference voltage AC is 2.35 VAC (RMS), at 400 Hz after scaling by phase shifter and scaler 136c. The analog multiplier 136a, provided by two separate devices as in the case of the circuit 10a multiplier of FIG. 4, accepts these input voltages and produces differential AC output voltages x and y according to the following relationships:

$$x = \left[\frac{(13 + V_1)}{10}\right] \times 2.35 \text{VAC(RMS)}$$

$$y = \left[\frac{(13 - V_1)}{10}\right] \times 2.35 \text{VAC(RMS)}$$

In the operation of the spoiler simulator circuit 12a, the output of integrator 132a (FIG. 7) varies from −7.9 V, representing a fully deployed spoiler surface to +7.9 V, representing full spoiler retraction. When $V_1$ is equal to 0, the spoiler is at an intermediate deployment level of approximately 27°. It will be assumed that circuit 12a has not received a previous deployment command from CSEU 16 (FIG. 1). Consequently, the corresponding spoiler, which is assumed to be spoiler No. 1 (far left-hand side) on the indicator panel 12b of FIG. 9, will be at zero degrees deployment and none of the corresponding display lights 140, 141, 142 and 143 for zero degrees, 20 degrees, 45 degrees, and 60 degrees, respectively, will be lit. Furthermore, the integrator output $V_1$ is equal to +7.9 V and the differential output of voltages x and y from modulator stage 136 (FIG. 8) is unbalanced so that a net output voltage from output transformers 138b is developed.

Now it is assumed that a step change in the input command $V_{in}$ from −2 volts to +8 volts is received at the input stage 130 (FIG. 7) of circuit 12a. The differential input signal is buffered in amplifier 130a, and a DC bias is subtracted therefrom and scaled in gain by bias and gain scaler 130b before being applied to the input of integrator stage 132. The bias subtracted from the input signal by bias and gain scaler 130b compensates for a voltage boost created in the input command signal $V_{in}$ to overcome a predetermined amount of mechanical friction in one of the electrohydraulically operated valves of the actual power control 42 (FIG. 2).

It is assumed that the input command $V_{in}$ is a positive (differential) voltage command causing the integrator 132a to produce an output voltage $V_1$ that ramps downwardly from its most positive range, which, according to the above-given example, is +7.9 volts, corresponding to the spoiler surfaces being fully retracted. The downwardly ramping output voltage $V_1$ is received and decoded by comparators and lamp drivers 134a of stage 134 which in turn responsively energize the No. 1 column of spoiler indicator lamps on the left-hand side of panel 12b (FIG. 9) as the simulated spoiler movement undergoes increasing deployment from zero degrees, to three degrees, to 20 degrees, et cetera, until full deployment is reached, or the command signal $V_{in}$ is stepped back to −2 volts (retract) or to a +4-volt (hold steady) level to halt the increasing deployment of the spoiler surface.

At the same time that indicator panel 12b responds to the decoding function of the display drive stage 134 (FIG. 7), the ramping voltage $V_1$ from integrator 132a is applied to modulator stage 136 to modulate the difference between the differential AC output voltages x and y according to the formulas described above and shown in FIG. 8. A corresponding change in the output voltage from the secondaries of the matched pair of output transformers 138b results, representing the variable amplitude and phase-changing feedback signal that simulates the surface LVDT output.

While only particular embodiments have been disclosed herein, it will be readily apparent to persons skilled in the art that numerous changes and modifications can be made thereto including the use of equivalent means, devices, and method steps without departing from the spirit of the invention.

The embodiments of the invention in which an exclusive property or privilege is claimed are defined as follows:

1. A simulator apparatus for simulating an electrohydraulic actuator and actuator/surface position sensing transducer for an actuator-controlled aircraft surface, wherein the position sensing transducer is of the linear variable differential transformer type, for closed-loop testing of aircraft controls of the type that generate actuator/surface positioning electrical command signals and receive as feedback, actuator/surface position feedback signals from said position-sensing transducer, comprising:

input amplifier means for receiving an electrical surface-positioning command signal;

signal integrator means connected to said input amplifier means for integrating the command signal at a predetermined rate, said rate being selected to produce an integrated command signal that simulates a response of an electrohydraulic actuator;

modulating circuit means having first and second input means and a differential output means;

reference signal source means for producing an alternating current reference signal having predetermined frequency, phase and amplitude, said first input means of said modulation circuit means being connected to said integrator means to receive said integrated command signal and said second input means of said modulation circuit means being connected to receive said alternating current reference signal so as to produce at said differential output means, differential alternating current signals that vary differentially in amplitude as a function of said integrated command signal; and a pair of output transformers each having a primary winding and a secondary winding, said primary windings of said pair of output transformers connected to said differential output means of said modulation circuit means for receiving said differential alternating current signals, and said secondary windings connected in series-opposing relation for simulating an output of an actuator/surface position transducer of the linear variable differential transformer type, whereby an alternating current signal is produced across the series-opposing secondary windings that varies in amplitude and phase in response to said surface-positioning command signal received at said input amplifier means.

2. The simulator apparatus of claim 1 wherein said modulation circuit means comprises analog multiplier means for multiplying the integrated command signal received at said first input with the alternating current reference signal received at said second input.

3. The simulator apparatus of claim 1 wherein said modulation circuit means comprises analog multiplier means having inputs for receiving said integrated command signal and said alternating current reference signal, and DC biasing means connected to said analog multiplier means, said analog multiplier means having a first output coupled across said primary winding of a first of said pair of output transformers for applying a modulated alternating current signal thereto that increases in amplitude in response to increases in said integrated command signal, and said analog multiplier means having a second output coupled across said primary winding of the other of said pair of output transformers for applying a modulated alternating current signal thereto that decreases in amplitude in response to increases in said integrated command signal, and said first and second outputs of said analog multiplier means applying common-mode modulated alternating current signals to said primary windings when said integrated command signal is zero.

4. The simulator apparatus of claim 1 further comprising a second pair of output transformers each having a primary winding and a secondary winding, and first signal-controlled switching means connected to said output means of said modulation circuit means and to said reference signal source means and to said primary windings of said second pair of output transformers for selectively applying either said differential alternating current signal or an unmodulated common-mode alternating current reference signal to said primary windings of said second pair of output transformers, said secondary windings of said second pair of output transformers being connected in series-opposed relationship for simulating an output of another actuator/surface position transducer of the linear variable differential transformer type.

5. The simulator apparatus of claim 4 adapted to receive first and second autopilot control signals, and further comprising second switching means associated with said integrator means for selectively enabling said integrator means in response to a first autopilot control signal, and wherein said first switching means is responsive to said second autopilot control signal.

6. The simulator apparatus of claim 1 further comprising comparator circuit means connected to said signal integrator means and being responsive to said integrated command signal for selectively producing indicator drive signals at preselected, different reference values of the integrated command signal; and electrical signal energized indicator means coupled to said comparator circuit means for responding to said indicator drive signals so as to indicate said different values of said integrated command signal during operation of the simulator apparatus.

7. The simulator apparatus of claim 6 wherein said electrical signal-energized indicator means comprises a plurality of visual indicator devices.

8. The simulator apparatus of claim 7 wherein said visual indicator devices comprise lamps.

9. The simulator apparatus of claim 5, further comprising comparator circuit means connected to said signal integrator means and being responsive to said integrated command signal for selectively producing indicator drive signals at preselected, different values of said integrated command signal; and electrical signal-energized indicator means coupled to said comparator means and responsive to said indicator drive signals so as to indicate said different values of said integrated command signal during operation of the simulator apparatus; and additional electrical signal-energized indicator means coupled to receive said first autopilot control signal and said second autopilot control signal for responding thereto so as to indicate the respective states of said first and second autopilot control signals during operation of said simulator apparatus.

10. The simulator apparatus of claim 1, wherein said input amplifier means comprises a differential input amplifier.

11. The simulator apparatus of claim 1 wherein said pair of output transformers is matched such that common-mode alternating current signals applied across said primary windings cause equal, opposite, and mutually cancelling signals to be developed on said series-opposing secondary windings, and so that differential alternating current signals applied to said primary windings cause differential noncancelling signals on said secondary windings that combine to produce a net alternating output signal having a magnitude and phase that vary as a function of said integrated command signal.

12. A simulator circuit for simulating an electrohydraulic actuator and actuator position-sensing transducer for an actuator-controlled mechanism, and associated with said actuator is a position-sensing transducer of the linear variable differential transformer (LVDT) type, wherein said simulator circuit is used for closed-loop testing of actuator controls of the type that generate electrical command signals for commanding said actuator to drive said actuator-controlled mechanism to a commanded position, and that receive as feedback, position feedback signals from said position-sensing transducer, comprising:

signal integrator means for receiving and integrating an actuator command signal to produce an integrated command signal;

a pair of output transformers, each having a primary winding and a secondary winding, said secondary windings connected in series-opposing relationship; and circuit means connected between said signal integrator means and said primary windings of said pair of output transformers for applying alternating current signals across said primary windings in which said alternating current signals assume a common mode that drives said primary windings equally in response to a predetermined reference value of said integrated command signal, and in which said alternating current signals vary differentially in amplitude in response to values of said integrated command signal other than said predetermined reference value, so that said primary windings are driven differentially to produce a difference output signal across said series-opposing secondary windings that simulates an output response of a transducer of the linear variable differential transformer type.

13. A method of simulating an electrohydraulic actuator and actuator/surface position-sensing transducer for an actuator-controlled aircraft surface in which said position-sensing transducer is of the linear variable differential transformer type, for closed-loop testing of aircraft controls of the type that generate actuator/surface positioning electrical command signals and receive as feedback, actuator/surface position feedback signals from said position-sensing transducer, comprising the steps of:

receiving and integrating said surface-positioning electrical command signal to produce an integrated command signal that simulates a response of an electrohydraulic actuator to an electrohydraulic input command;

producing a simulated feedback signal representing an output from a position-sensing transducer of the linear variable differential transformer type by applying modulated differential alternating current signals across primary windings of a pair of output transformers that have their secondary windings connected in series-opposing relation so that said differential alternating current signals vary differentially in amplitude as a function of said integrated command signal and so that said simulated output signal is produced in the form of an alternating current signal across said series-opposing secondary windings and varies in amplitude in response to said surface-positioning command signal.

14. The method of claim 13 wherein the step of producing said differential alternating current signals comprises the substeps of providing an alternating current reference signal having predetermined frequency, phase and amplitude, and modulating said reference signal in response to said integrated command signal so as to cause said differential alternating current signals to vary differentially in amplitude as a function of said integrated command signal.

15. The method of claim 14 wherein said substep of modulating said reference signal comprises the further substep of multiplying in an analog multiplier, said integrated command signal and said alternating current reference signal.

16. The method of claim 13 further comprising the step of visually indicating the actuator/surface position corresponding to said simulated output of said position-sensing transducer by receiving said integrated command signal and comparing the value of said integrated command signal with a plurality of predetermined, different reference values thereof and generating a corresponding plurality of indicator drive signals, respectively, in response to said integrated command signal assuming said different reference values; and selectively energizing a plurality of visual indicator devices in response to said indicator drive signals.

17. The method of claim 13, wherein said integrated command signal has a reference level at which said differential alternating current signals are equal and hence are in a common mode, and said integrated command signal varies above and below said reference level to cause said differential alternating current signals to produce a phase shift of the simulated output signal as said integrated command signal passes through said reference level.

* * * * *